(12) United States Patent
Toda et al.

(10) Patent No.: US 12,214,666 B2
(45) Date of Patent: Feb. 4, 2025

(54) VEHICLE DRIVING APPARATUS

(71) Applicant: Mazda Motor Corporation, Hiroshima (JP)

(72) Inventors: Isao Toda, Aki-gun (JP); Seiyo Hirano, Aki-gun (JP); Kei Yonemori, Aki-gun (JP); Satoshi Maruyama, Aki-gun (JP); Shinji Fujihira, Aki-gun (JP); Wataru Kuwahara, Aki-gun (JP); Tomoya Kakite, Aki-gun (JP); Yoshiaki Noguchi, Aki-gun (JP); Ryuichiro Amano, Aki-gun (JP); Mitsuhiro Hirota, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 672 days.

(21) Appl. No.: 17/409,798

(22) Filed: Aug. 24, 2021

(65) Prior Publication Data
US 2021/0379979 A1 Dec. 9, 2021

Related U.S. Application Data

(63) Continuation of application No. PCT/JP2020/008016, filed on Feb. 27, 2020.

(30) Foreign Application Priority Data

Feb. 27, 2019 (JP) .................................. 2019-033653
Aug. 21, 2019 (JP) .................................. 2019-150932

(51) Int. Cl.
*B60K 6/24* (2007.10)
*B60K 6/26* (2007.10)
(Continued)

(52) U.S. Cl.
CPC .................. *B60K 6/24* (2013.01); *B60K 6/26* (2013.01); *B60K 6/36* (2013.01); *F01M 11/0004* (2013.01);
(Continued)

(58) Field of Classification Search
CPC ... B60K 6/24; B60K 6/26; B60K 6/36; B60K 6/405; B60K 6/46; B60K 6/40;
(Continued)

(56) References Cited

U.S. PATENT DOCUMENTS 5,072,698 A * 12/1991 Fujihira .............. F02B 29/0456
123/184.55
5,513,719 A 5/1996 Moroto et al.
(Continued)

FOREIGN PATENT DOCUMENTS

| JP | 6-328950 A | 11/1994 |
| JP | 2008-195233 A | 8/2008 |
| JP | 2013-133019 A | 7/2013 |

OTHER PUBLICATIONS

International Search Report and Written Opinion mailed on May 26, 2020, received for PCT Application PCT/JP2020/008016, Filed on Feb. 27, 2020, 9 pages including English Translation.

*Primary Examiner* — James M Dolak
(74) *Attorney, Agent, or Firm* — XSENSUS LLP

(57) ABSTRACT

A vehicle driving apparatus is provided that includes a drive motor, an internal combustion engine, and an electrical generator and can inhibit a weight balance and motion performance of a vehicle from being deteriorated and lowered. A vehicle driving apparatus driving a vehicle by motive power of a motor, the vehicle driving apparatus including a drive motor that is driven by electric power, an internal combustion engine that produces motive power by fuel, and an electrical generator that is driven by the internal combustion engine, the vehicle driving apparatus being charac- (Continued)

terized in that the drive motor, the internal combustion engine, and the electrical generator are arranged in a vehicle width direction of the vehicle in order of the drive motor, the internal combustion engine, and the electrical generator.

15 Claims, 7 Drawing Sheets

(51) Int. Cl.
*B60K 6/36* (2007.10)
*F01M 11/00* (2006.01)
*F02B 53/04* (2006.01)
*F02B 63/04* (2006.01)

(52) U.S. Cl.
CPC ............ *F02B 53/04* (2013.01); *F02B 63/042* (2013.01); *B60Y 2200/92* (2013.01)

(58) Field of Classification Search
CPC ... B60K 6/00; B60K 6/20; B60K 6/22; B60K 6/42; B60Y 2200/92; B60Y 2200/90; F01M 11/0004; F01M 5/002; F02B 53/04; F02B 53/00; F02B 63/042; F02B 63/00; F02B 63/04
See application file for complete search history.

(56) References Cited

U.S. PATENT DOCUMENTS

| | | | | |
|---|---|---|---|---|
| 5,689,174 | A * | 11/1997 | Pacheco, Sr. ......... | H02J 7/1415 290/47 |
| 5,704,440 | A * | 1/1998 | Urban ................... | B60W 20/20 180/65.23 |
| 6,059,064 | A * | 5/2000 | Nagano ................. | B60W 20/00 903/903 |
| 6,460,642 | B1 * | 10/2002 | Hirano .................... | B60K 6/40 903/952 |
| 6,984,783 | B2 * | 1/2006 | Kusumi .................. | B60L 58/10 290/40 C |
| 7,610,978 | B2 | 11/2009 | Takasaki et al. | |
| 7,969,735 | B2 * | 6/2011 | Nakatsu ................. | B60L 15/20 361/689 |
| 7,980,340 | B2 * | 7/2011 | Luo ....................... | B60W 20/00 180/65.21 |
| 8,485,292 | B2 * | 7/2013 | Wakatsuki ............. | B60K 11/02 417/423.15 |
| 8,813,883 | B2 * | 8/2014 | Fujiwara ................. | B60K 6/46 180/312 |
| 9,469,186 | B2 * | 10/2016 | Swales ................. | B60K 17/354 |
| 9,724,990 | B2 * | 8/2017 | Hoermandinger ....... | B60K 1/00 |
| 9,827,971 | B2 * | 11/2017 | Suzuki .................. | B60L 53/126 |
| 10,214,089 | B2 * | 2/2019 | Chi-Hsueh .............. | H02K 1/30 |
| 10,381,902 | B2 * | 8/2019 | Fukushima ............ | H02K 7/006 |
| 11,667,184 | B2 * | 6/2023 | Miyakawa .............. | B60K 6/46 180/65.22 |
| 12,012,001 | B2 * | 6/2024 | Tanaka .................. | B60K 6/24 |
| 12,077,049 | B2 * | 9/2024 | Tanizawa .............. | B60L 3/0061 |

* cited by examiner

VEHICLE DRIVING APPARATUS

CROSS-REFERENCE TO RELATED APPLICATIONS

The present application is based on PCT filing PCT/JP2020/008016, filed Feb. 27, 2020, which claims priority to Japanese Patent Application 2019-033653, filed Feb. 27, 2019, and Japanese Patent Application 2019-150932, filed Aug. 21, 2019, the entire contents of which are incorporated herein by reference.

BACKGROUND

Field

The present disclosure relates to a vehicle driving apparatus and particularly to a vehicle driving apparatus driving a vehicle by motive power of a motor.

Description of the Related Art

Japanese Patent Laid-Open No. 6-328950 (Patent Literature 1) discloses a hybrid vehicle. In this hybrid vehicle, an electric motor, an automatic transmission apparatus, a clutch, a generator, and an engine are in this order arranged in a vehicle width direction, are coaxially arranged with an output shaft of the engine, and are accommodated in an integral casing. That is, the generator is arranged adjacently to the engine, the electric motor is arranged at an outer side end, and an output gear of the automatic transmission apparatus and the clutch are arranged therebetween. Usually, the clutch is disconnected, the generator is driven by the engine, and rotation of the electric motor is transmitted to a drive axle via the automatic transmission apparatus, the output gear arranged in a central portion, and a differential apparatus.

CITATION LIST

Patent Literature

Patent Literature 1: Japanese Patent Laid-Open No. 6-328950

SUMMARY

However, a vehicle driving apparatus included in a hybrid vehicle disclosed in Patent Literature 1 has a problem that because an engine with a large weight is arranged in an end portion of a vehicle drive system, a side of the vehicle on which the engine is arranged becomes heavy, and a weight balance between left and right of the vehicle may be deteriorated. In addition, there is a problem that because the engine with a large weight is arranged in the vicinity of a side surface of the vehicle, inertia moments around a yaw axis and a roll axis of the vehicle become large, and motion performance of the vehicle may lower.

Accordingly, an object of the present disclosure is to provide a vehicle driving apparatus that includes a drive motor, an internal combustion engine, and an electrical generator and can inhibit a weight balance and motion performance of a vehicle from being deteriorated and lowered.

To solve the above-described problems, the present disclosure describes a vehicle driving apparatus driving a vehicle by motive power of a motor, the vehicle driving apparatus including: a drive motor that is driven by electric power; an internal combustion engine that produces motive power by fuel; and an electrical generator that is driven by the internal combustion engine, the vehicle driving apparatus being characterized in that the drive motor, the internal combustion engine, and the electrical generator are arranged in a vehicle width direction of the vehicle in order of the drive motor, the internal combustion engine, and the electrical generator.

According to the present vehicle driving apparatus configured in such a manner, the drive motor, the internal combustion engine, and the electrical generator are arranged in the vehicle width direction of the vehicle in this order. As a result, because the internal combustion engine with a comparatively large weight is positioned between the drive motor and the electrical generator, the weight balance between left and right of the vehicle is less likely to be unstable, and the weight balance can be inhibited from being deteriorated. Further, because the internal combustion engine is positioned between the drive motor and the electrical generator, the internal combustion engine is positioned on a comparatively inner side in the vehicle width direction, inertia moments around a yaw axis and around a roll axis of the vehicle can be lowered, and lowering of motion performance can thereby be inhibited.

In the present disclosure, the internal combustion engine is preferably a rotary piston engine or a horizontally opposed engine.

Among internal combustion engines, in general, overall heights of a rotary piston engine and a horizontally opposed engine are lower than internal combustion engines of other types. According to the present vehicle driving apparatus configured as described above, because the internal combustion engine is a rotary piston engine or a horizontally opposed engine, the internal combustion engine is less likely to be bulky in a motor room even when being arranged between the drive motor and the electrical generator. Thus, even when the internal combustion engine is arranged between the drive motor and the electrical generator, a space in the motor room can effectively be utilized.

In the present disclosure, the internal combustion engine is preferably a rotary piston engine, and an intake pipe and an exhaust pipe of the rotary piston engine preferably extend from a rear side of the rotary piston engine in a front-rear direction of the vehicle to a rearward side of the vehicle.

In general, in an in-line engine and a V-type engine, an intake pipe and an exhaust pipe extend from both sides of an engine, and a rotary piston engine is capable of being configured such that an intake pipe and an exhaust pipe extend from one side of the engine. According to the present vehicle driving apparatus configured as described above, a rotary piston engine is employed as the internal combustion engine, and the intake pipe and the exhaust pipe extend rearward from the rear side of the rotary piston engine. Accordingly, routing of the intake pipe and the exhaust pipe can be simplified, and intake efficiency and exhaust efficiency can be improved.

In the present disclosure, the vehicle driving apparatus preferably further includes a speed reduction mechanism provided in a transmission path for transmitting motive power of the drive motor to a wheel of the vehicle, and the speed reduction mechanism is preferably arranged between the drive motor and the internal combustion engine in the vehicle width direction of the vehicle.

According to the present vehicle driving apparatus configured in such a manner, because the speed reduction mechanism is arranged between the drive motor and the internal combustion engine in the vehicle width direction of the vehicle, speed reduction can be performed by easily connecting an output of the drive motor to the speed reduction mechanism.

In the present disclosure, the vehicle driving apparatus preferably further includes: an electric power conversion apparatus electrically connected with each of the drive motor and the electrical generator; a first conductor connecting the electric power conversion apparatus with the drive motor; and a second conductor connecting the electric power conversion apparatus with the electrical generator, in which each of the first conductor and the second conductor is preferably arranged in an internal portion of a casing of the electric power conversion apparatus, a casing of the drive motor, or a casing of the electrical generator, and the casing of the electric power conversion apparatus is preferably joined to each of the casing of the drive motor and the casing of the electrical generator so as to straddle over the internal combustion engine.

According to the present vehicle driving apparatus configured in such a manner, the first conductor and the second conductor are arranged in the internal portion of the casing of the electric power conversion apparatus, the casing of the drive motor, or the casing of the electrical generator. Thus, an insulating material for securing insulation of the first and second conductors extending in the internal portions of the casings can be simplified compared to insulating materials for harnesses connecting electric devices in external portions of casings. Accordingly, costs required for insulating materials and weights can be reduced.

In the present disclosure, a center of the casing of the electric power conversion apparatus in the vehicle width direction is preferably positioned on a side where the drive motor is arranged with respect to a central axis line of the vehicle that extends in a front-rear direction of the vehicle.

According to the present vehicle driving apparatus configured in such a manner, because the center of the casing of the electric power conversion apparatus is positioned on the side where the drive motor is arranged with respect to the central axis line of the vehicle, the weight balance of the whole vehicle driving apparatus can further be improved.

In the present disclosure, the electric power conversion apparatus preferably includes an inverter that is electrically connected with the drive motor and converts a direct current to an alternating current and a converter that is electrically connected with the electrical generator and converts an alternating current to a direct current.

According to the present vehicle driving apparatus configured in such a manner, because the casing of the electric power conversion apparatus and the casing of the drive motor are joined together and the inverter converting a direct current to an alternating current is included in the electric power conversion apparatus, direct current electric power supplied from a battery or the like can be converted to an alternating current and can be supplied to the drive motor in a short distance. Accordingly, the alternating-current drive motor can be operated in a compact configuration. According to the present vehicle driving apparatus configured as described above, because the casing of the electric power conversion apparatus and the casing of the electrical generator are joined together and the converter converting an alternating current to a direct current is included in the electric power conversion apparatus, alternating current electric power generated by the electrical generator can easily be converted to a direct current in the electric power conversion apparatus. Accordingly, an output of the alternating-current electrical generator can be charged to a battery or the like in a compact configuration.

In the present disclosure, in a planar view, the drive motor and the casing of the electric power conversion apparatus arranged above the drive motor preferably overlap with each other, the electrical generator and the casing of the electric power conversion apparatus arranged above the electrical generator preferably overlap with each other, and an overlapping amount between the drive motor and the casing of the electric power conversion apparatus is preferably configured to be larger than an overlapping amount between the electrical generator and the casing of the electric power conversion apparatus.

According to the present vehicle driving apparatus configured in such a manner, the overlapping amount between the drive motor and the casing of the electric power conversion apparatus is configured to be larger than the overlapping amount between the electrical generator and the casing of the electric power conversion apparatus. Thus, the casing of the electric power conversion apparatus is arranged, the center of gravity of the vehicle driving apparatus can thereby be moved to the drive motor side, and the weight balance of the whole vehicle driving apparatus can further be improved.

In the present disclosure, the drive motor, the internal combustion engine, and the electrical generator are preferably housed in a motor room provided in a front portion of the vehicle, and the drive motor, the internal combustion engine, and the electrical generator are preferably arranged below a bonnet covering the motor room.

According to the present vehicle driving apparatus configured in such a manner, because the drive motor, the internal combustion engine, and the electrical generator are arranged below the bonnet, a space below the bonnet can effectively be utilized.

In the present disclosure, in a front view, an oil pan is preferably provided in a lower portion of the internal combustion engine, and an output shaft of the internal combustion engine is preferably arranged to be offset to a vehicle upward side with respect to an output shaft of the drive motor.

According to the present vehicle driving apparatus configured in such a manner, the output shaft of the internal combustion engine is arranged to be offset above the output shaft of the drive motor, and a capacity of the oil pan in the lower portion of the internal combustion engine can thereby appropriately be secured.

In the present disclosure, in a planar view, a front end portion of the internal combustion engine is preferably positioned on a vehicle forward side of a front end portion of the drive motor.

According to the present vehicle driving apparatus configured in such a manner, in a collision of a vehicle front portion, an object moving from the front toward the vehicle driving apparatus can be caused to contact with the internal combustion engine earlier than the drive motor, and the drive motor can thereby appropriately be protected by the internal combustion engine.

In the present disclosure, in a planar view, an output shaft of the internal combustion engine is preferably arranged to be offset to a vehicle forward side with respect to an output shaft of the drive motor, and a predetermined auxiliary device related to the internal combustion engine is preferably mounted on a front portion of the internal combustion engine in front of the drive motor.

According to the present vehicle driving apparatus configured in such a manner, the output shaft of the internal combustion engine is arranged to be offset forward with respect to the output shaft of the drive motor, a space can be formed in front of the drive motor, and an auxiliary device (engine auxiliary device) of the internal combustion engine can thereby be arranged in this space. Accordingly, an increase in a dimension of the vehicle driving apparatus in the vehicle width direction can appropriately be inhibited. Further, the auxiliary device of the internal combustion engine is arranged in front of the drive motor, and in a collision of the vehicle front portion, the drive motor can thereby appropriately be protected by the auxiliary device.

In the present disclosure, each of the drive motor, the internal combustion engine, and the electrical generator is preferably arranged such that each of an output shaft of the internal combustion engine, an output shaft of the drive motor, and an input shaft of the electrical generator extends along the vehicle width direction.

According to the present vehicle driving apparatus configured in such a manner, in a case where the internal combustion engine, the drive motor, and the electrical generator are laterally arranged along the vehicle width direction, the above-described effects can be obtained.

DETAILED DESCRIPTION

Next, a vehicle driving apparatus according to an embodiment of the present disclosure will be described with reference to the attached drawings.

Figure 1:
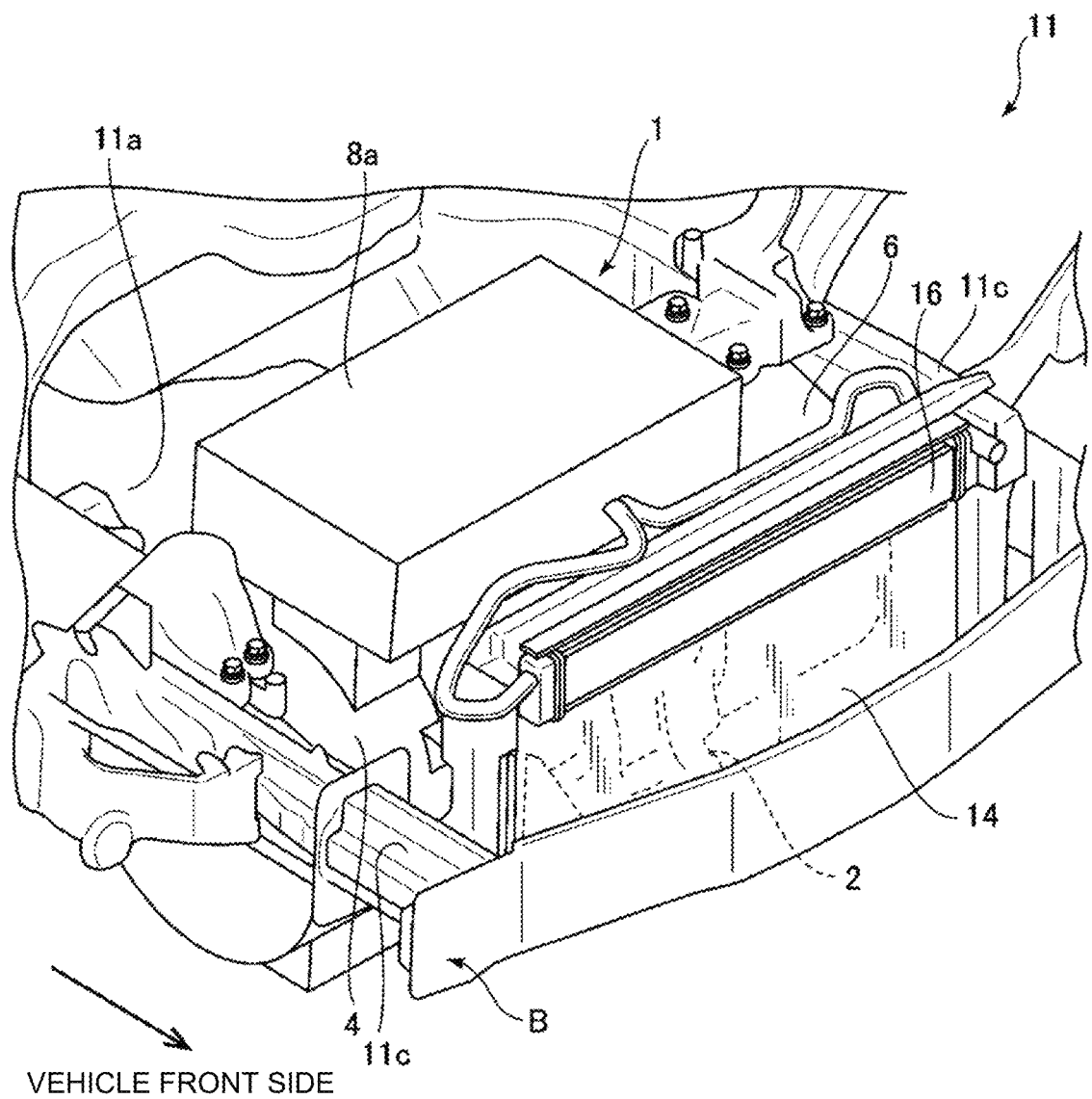
FIG. 1 is a perspective view illustrating a state where a vehicle driving apparatus according to an exemplary embodiment of the present disclosure is installed in a vehicle.
Figure 2:
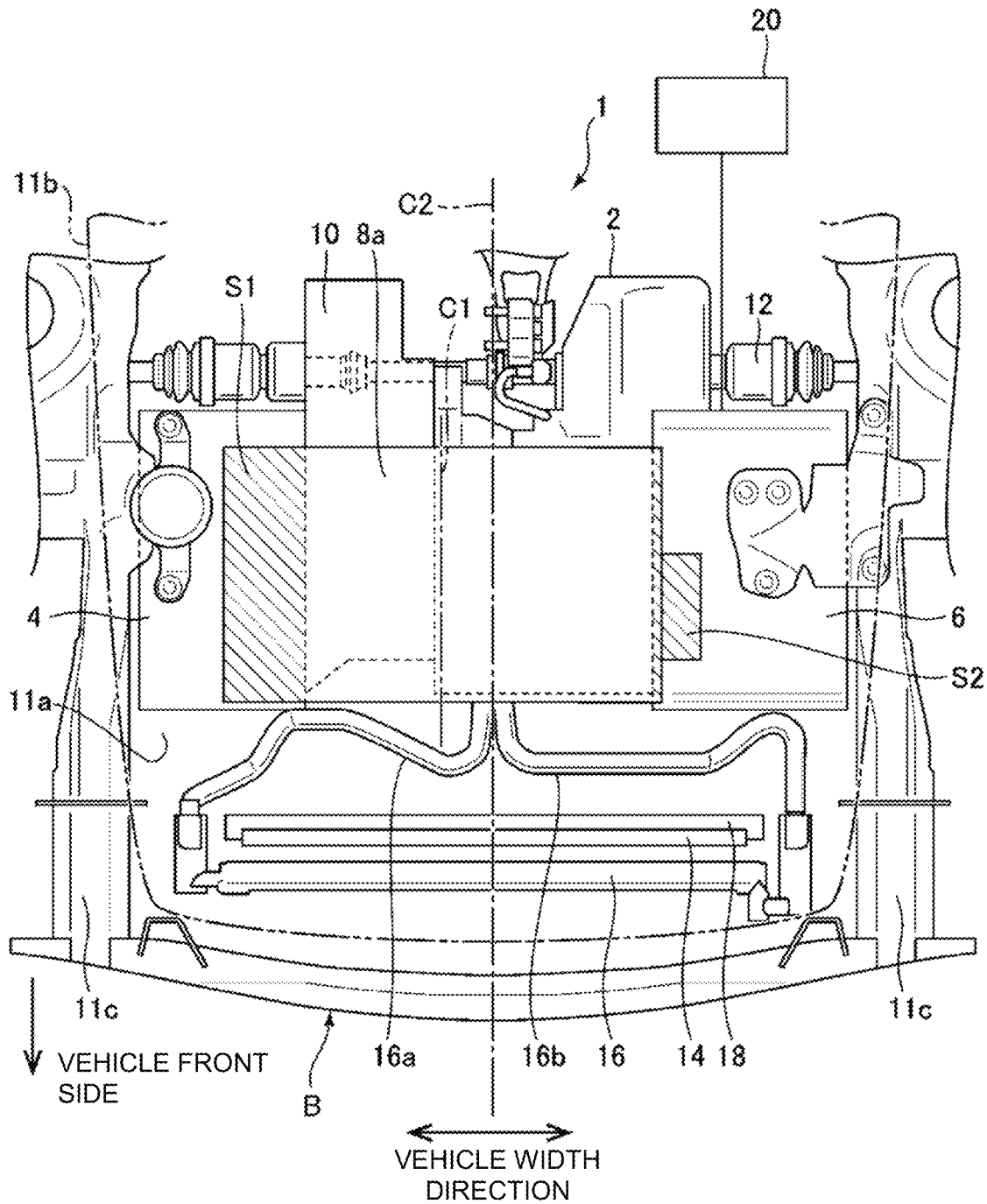
FIG. 2 is a plan view illustrating a state where the vehicle driving apparatus according to an exemplary embodiment of the present disclosure is installed in the vehicle.
Figure 3:
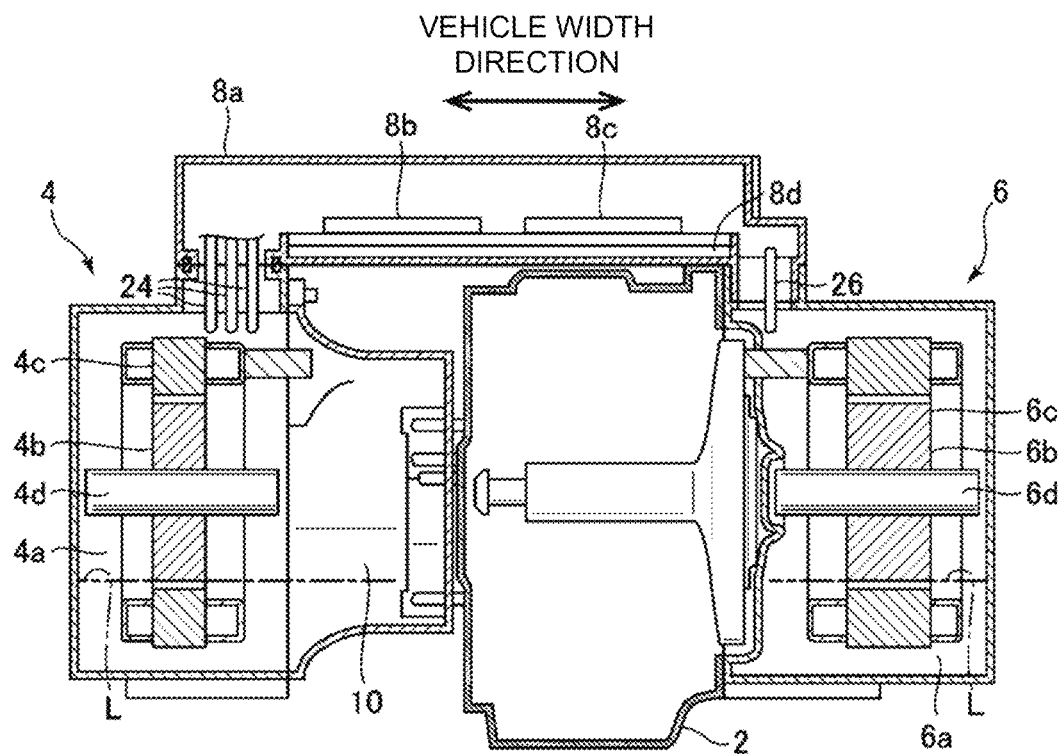
FIG. 3 is a cross-sectional view illustrating internal structures of a drive motor, a generator, and an electric power conversion apparatus casing in the vehicle driving apparatus according to an exemplary embodiment of the present disclosure.

FIG. 1 is a perspective view illustrating a state where the vehicle driving apparatus according to an embodiment of the present disclosure is installed in a vehicle. FIG. 2 is a plan view illustrating a state where the vehicle driving apparatus according to an embodiment of the present disclosure is installed in the vehicle. FIG. 3 is a cross-sectional view illustrating internal structures of a drive motor, a generator, and an electric power conversion apparatus casing in the vehicle driving apparatus according to an embodiment of the present disclosure as seen from a forward side of the vehicle. Note that in FIG. 1 to FIG. 3, an intake pipe and an exhaust pipe that extend from an internal combustion engine can be included.

First, a description will be made about an arrangement structure of each configuration in a vehicle driving apparatus 1 according to the present embodiment with reference to FIG. 1 to FIG. 3.

In the vehicle driving apparatus 1 according to the present embodiment, an internal combustion engine 2, a drive motor 4, a generator 6 as an electrical generator, an electric power conversion apparatus casing 8a, and a reduction gear 10 as a speed reduction mechanism reducing a speed of a rotation output of the drive motor 4 are integrally formed. Note that as described later, in the present embodiment, an inverter 8b and a converter 8c (FIG. 3) as electric power conversion apparatuses are built in the electric power conversion apparatus casing 8a. Further, as described later, in the present embodiment, a drive shaft 12 (FIG. 2) of the vehicle is driven by a driving force of the drive motor 4 but is not directly driven by motive power generated by the internal combustion engine 2.

Further, as illustrated in FIG. 1 and FIG. 2, the vehicle driving apparatus 1 is housed in a motor room 11a in a front portion of a vehicle 11, and this motor room 11a is covered by a bonnet 11b. Further, the drive motor 4, the reduction gear 10 (FIG. 2), the internal combustion engine 2, and the generator 6, which constitute the vehicle driving apparatus 1, are arranged in this order in a vehicle width direction of the vehicle 11. That is, the vehicle driving apparatus 1 is arranged between body side frames 11c on both sides of the vehicle 11 and below the bonnet 11b.

In addition, the vehicle driving apparatus 1 according to the present embodiment includes a radiator 14 dedicated to the internal combustion engine for cooling the internal combustion engine 2, an oil cooler 18 (FIG. 2), and a radiator 16 dedicated to the electric power conversion apparatuses. Note that the radiator 16 dedicated to the electric power conversion apparatuses is configured to cool the electric power conversion apparatuses, and the oil cooler 18 is configured to cool the drive motor 4 and the generator 6.

The internal combustion engine 2 is configured to generate motive power by combusting fuel loaded on the vehicle, an input shaft of the generator 6 is driven by the motive power generated by the internal combustion engine 2, and electric power is thereby generated. The electric power generated by the generator 6 is accumulated as electrical energy in a lithium-ion battery 20 (FIG. 2) as a storage battery. Note that in the present embodiment, a rotary piston engine is employed as the internal combustion engine 2.

The drive motor 4 is configured to be driven by the electrical energy accumulated in the lithium-ion battery 20 and to drive the drive shaft 12 of the vehicle 11. An output shaft of the drive motor 4 is connected with an input shaft of the reduction gear 10 as the speed reduction mechanism, and a rotation output of the drive motor 4 drives the drive shaft 12 via the reduction gear 10. Further, the drive motor 4 is configured to perform regeneration of electrical energy from kinetic energy of the vehicle and to thereby generate alternating current electric power when the vehicle 11 is decelerated. In the present embodiment, a permanent magnet motor driven by alternating current is employed as the drive motor 4.

The generator 6 is configured to generate alternating current electric power by motive power generated by the internal combustion engine 2, and the input shaft thereof is driven to be rotated by an output shaft of the internal combustion engine 2. The alternating current electric power generated by the generator 6 is converted to a direct current by the converter 8c in the electric power conversion apparatus casing 8a and is accumulated in the lithium-ion battery 20.

The reduction gear 10 is a speed reduction mechanism arranged between the drive motor 4 and the internal combustion engine 2 in a width direction of the vehicle 11 and is provided in a halfway portion of a transmission path for transmitting motive power of the drive motor 4 to wheels of the vehicle 11. The reduction gear 10 performs speed reduction for rotation of an output shaft 4d (FIG. 3) of the drive motor 4, and the rotation is transmitted to the wheels (not illustrated) via the drive shaft 12. Note that in the present embodiment, the reduction gear 10 is employed as a speed reduction mechanism, but a transmission having a speed change function may be employed as a speed reduction mechanism.

The electric power conversion apparatus casing 8a is a casing of the electric power conversion apparatuses, and in its internal portion, the inverter 8b and the converter 8c (FIG. 3) as the electric power conversion apparatuses are built in the integral casing. Further, the inverter 8b is configured to convert direct current electric power supplied from the lithium-ion battery 20 to alternating current electric power. The converter 8c is configured to convert alternating current electric power generated by the generator 6 and alternating current electric power regenerated by the drive motor 4 to direct current electric power. The electric power converted to an alternating current by the inverter 8b is supplied to the drive motor 4, and the drive motor 4 is driven. Further, the electric power converted to a direct current by the converter 8c is charged to the lithium-ion battery 20. Note that in the electric power conversion apparatus casing 8a, a DC-DC converter (not illustrated) boosting and/or dropping a direct current voltage or a junction box may be built.

Further, the electric power conversion apparatus casing 8a is arranged above the drive motor 4, the reduction gear 10, the internal combustion engine 2, and the generator 6 and is arranged to overlap with those in a planar view (top view). In addition, the electric power conversion apparatus casing 8a, a casing of the drive motor 4, and a casing of the generator 6 are joined together and form an integrated casing. Here, in general, a motor, a generator, and electric power conversion apparatuses are respectively housed in independent casings, and those casings are electrically connected together by wire harnesses. On the other hand, in the vehicle driving apparatus 1 of the present embodiment, the drive motor 4, the generator 6, and the electric power conversion apparatus casing 8a are integrated, and wire harnesses for connecting those together are not provided. Thus, conductors extending in an internal portion of the integrated casing respectively connect the electric power conversion apparatus casing 8a with the drive motor 4 and the electric power conversion apparatus casing 8a with the generator 6.

Further, as illustrated in FIG. 2, a center C1 of the electric power conversion apparatus casing 8a in the vehicle width direction is positioned on a side where the drive motor 4 is arranged with respect to a central axis line C2 of the vehicle 11 that extends in a front-rear direction of the vehicle 11. Thus, the overlapping amount (hatched part S1 in FIG. 2) between the drive motor 4 and the electric power conversion apparatus casing 8a is larger than the overlapping amount (hatched part S2 in FIG. 2) between the generator 6 and the electric power conversion apparatus casing 8a. That is, the vehicle driving apparatus 1 of the present embodiment, the ratio of the weight occupied by the internal combustion engine 2 to the whole weight is high. Thus, the position of the center of gravity of the whole vehicle driving apparatus 1 tends to deviate to a side where the internal combustion engine 2 is arranged with respect to the central axis line C2 of the vehicle 11. In the present embodiment, the center C1 of the electric power conversion apparatus casing 8a is positioned on the side where the drive motor 4 is arranged with respect to the central axis line C2 of the vehicle 11, and deviation in weight balance of the vehicle driving apparatus 1 is thereby inhibited.

As illustrated in FIG. 2, the radiator 14 dedicated to the internal combustion engine is a flat-plate-shaped heat exchanger arranged on a front side of the vehicle relative to the internal combustion engine 2 and is configured such that traveling air contacts with a plate surface of the heat exchanger due to traveling of the vehicle and heat of a cooling liquid is dissipated to the atmosphere. Further, the internal combustion engine 2 and the radiator 14 dedicated to the internal combustion engine are connected together by piping for the cooling liquid and are configured such that the cooling liquid circulates between the radiator 14 dedicated to the internal combustion engine and the internal combustion engine 2. That is, the cooling liquid whose temperature is raised by cooling the internal combustion engine 2 is sent to the radiator 14 dedicated to the internal combustion engine, causes its heat to be dissipated, causes its temperature to be lowered there, and is thereafter returned to the internal combustion engine 2.

The radiator 16 dedicated to the electric power conversion apparatuses is a long and narrow flat-plate-shaped heat exchanger arranged on the front side of the vehicle relative to the radiator 14 dedicated to the internal combustion engine and is configured such that traveling air of the vehicle contacts with a plate surface of the heat exchanger and heat of a cooling liquid is dissipated to the atmosphere. Further, the electric power conversion apparatus casing 8a and the radiator 16 dedicated to the electric power conversion apparatuses are connected together by an inflow pipe 16a and an outflow pipe 16b and are configured such that the cooling liquid circulates. That is, the cooling liquid whose temperature is raised by cooling the electric power conversion apparatuses in the electric power conversion apparatus casing 8a flows into the radiator 16 dedicated to the electric power conversion apparatuses via the inflow pipe 16a. The cooling liquid flowing thereinto causes its heat to be dissipated in the radiator 16 dedicated to the electric power conversion apparatuses, and the cooling liquid whose temperature is lowered is returned to the electric power conversion apparatus casing 8a via the outflow pipe 16b and again cools the electric power conversion apparatuses.

The oil cooler 18 is a long and narrow flat-plate-shaped heat exchanger arranged on a lower side of the radiator 14 dedicated to the internal combustion engine and is configured such that traveling air of the vehicle contacts with a plate surface of the heat exchanger and heat of a cooling liquid is dissipated to the atmosphere. Piping connects the oil cooler 18 with the drive motor 4 and the oil cooler 18 with the generator 6. In addition, the generator 6 and the drive motor 4 are connected together by a transfer pipe. That is, the cooling liquid whose temperature is raised by cooling the drive motor 4 flows into the oil cooler 18, heat of the cooling liquid flowing thereinto is dissipated in the oil cooler 18, the cooling liquid whose temperature is lowered is returned to the generator 6, and the generator 6 is cooled.

The cooling liquid cooling the generator 6 is sent to the drive motor 4 via the transfer pipe, and the drive motor 4 is cooled.

The electric power conversion apparatuses in the electric power conversion apparatus casing 8a are cooled by the radiator 16 dedicated to the electric power conversion apparatuses, and a water-based cooling liquid circulates between the electric power conversion apparatus casing 8a and the radiator 16 dedicated to the electric power conversion apparatuses and cools the electric power conversion apparatuses. That is, hot water whose temperature is raised by cooling the electric power conversion apparatuses is sent to the radiator 16 dedicated to the electric power conversion apparatuses and is cooled. In addition, cold water whose temperature is lowered by being cooled by the radiator 16 dedicated to the electric power conversion apparatuses is returned to the electric power conversion apparatus casing 8a and cools the electric power conversion apparatuses in the internal portion thereof.

Next, again referring to FIG. 3, a description will be made about connection structures of the drive motor 4, the generator 6, and the electric power conversion apparatus casing 8a in the vehicle driving apparatus 1 of the present embodiment.

FIG. 3 is a cross-sectional view illustrating internal structures of the drive motor 4, the generator 6, and the electric power conversion apparatus casing 8a.

As illustrated in FIG. 3, the drive motor 4 has a motor casing 4a as a casing of the drive motor 4, a rotor 4b and a stator 4c that are housed in this motor casing 4a, and the output shaft 4d. The rotor 4b is joined to the output shaft 4d directed in the horizontal direction and is supported rotatably around, as a center, a horizontal axis line with respect to the motor casing 4a. The stator 4c is fixed to the motor casing 4a and is configured to rotate and drive the rotor 4b by causing an alternating current to flow through a coil constituting the stator 4c. Meanwhile, in deceleration, the output shaft 4d is driven to be rotated on kinetic energy carried by the vehicle. Accordingly, because the rotor 4b is driven to be rotated together with the output shaft 4d, an induced current is produced in the stator 4c, and the kinetic energy of the vehicle is regenerated as electrical energy.

The generator 6 has a generator casing 6a as a casing of the generator 6, a rotor 6b and a stator 6c that are housed in this generator casing 6a, and an input shaft 6d. The rotor 6b is joined to the input shaft 6d directed in the horizontal direction and is supported rotatably around, as a center, a horizontal axis line with respect to the generator casing 6a. The stator 6c is fixed to the generator casing 6a and is configured such that when the rotor 6b is driven to be rotated by a driving force of the internal combustion engine 2, an induced current flows through a coil constituting the stator 6c, and alternating current electric power is generated.

In the electric power conversion apparatus casing 8a, the inverter 8b and the converter 8c are housed and integrated as an electric drive system unit. The inverter 8b and converter 8c are formed of circuit substrates including electric power semiconductor elements such as an IGBT (insulated-gate bipolar transistor) and a MOSFET (MOS field-effect transistor) for switching and a diode for rectification. Note that depending on a configuration of an electric drive system of the vehicle, a DC-DC converter converting a direct current voltage may be included in the electric power conversion apparatus casing 8a.

In addition, because the electric power semiconductor element on the circuit substrate produces heat when operating, in order to cool this, a cooling liquid chamber 8d is provided in the electric power conversion apparatus casing 8a. The inflow pipe 16a and the outflow pipe 16b are connected with this cooling liquid chamber 8d, and a cooling liquid different from the cooling liquid circulating in the oil cooler 18 is caused to circulate between the cooling liquid chamber 8d and the radiator 16 dedicated to the electric power conversion apparatuses (FIG. 1). As described above, the cooling liquid is caused to circulate in the cooling liquid chamber 8d, the cooling liquid chamber 8d thereby acts as a water jacket, and the inverter 8b and the converter 8c in the electric power conversion apparatus casing 8a are cooled. Further, so that the cooling liquid is caused to efficiently flow in the cooling liquid chamber 8d, wall surfaces in the cooling liquid chamber 8d are formed flat.

Further, one end portion of a bottom surface of the electric power conversion apparatus casing 8a is fastened and fixed to an upper end portion of the motor casing 4a of the drive motor 4 and is integrated together. In addition, another end portion of the bottom surface of the electric power conversion apparatus casing 8a is fastened and joined to an upper end portion of the generator casing 6a of the generator 6 and is integrated together so as to straddle over the reduction gear 10 and the internal combustion engine 2. As described above, in the present embodiment, the electric power conversion apparatus casing 8a, the motor casing 4a, and the generator casing 6a that are configured as separate bodies are fastened together, and an integrated casing is thereby configured; however, a portion or all of those casings may integrally be molded.

Here, as described above, the electric power supplied from the lithium-ion battery 20 is supplied to the drive motor 4 via the inverter 8b in the electric power conversion apparatus casing 8a. Thus, plural bus bars 24 as first conductors for connecting the inverter 8b with the drive motor 4 extend in an internal portion of the motor casing 4a and the electric power conversion apparatus casing 8a that are integrated. Further, the alternating current electric power regenerated by the drive motor 4 is charged to the lithium-ion battery 20 via the converter 8c. Thus, the bus bars 24 extending in the internal portion of the motor casing 4a and the electric power conversion apparatus casing 8a that are integrated are used also when the alternating current electric power regenerated by the drive motor 4 is supplied to the converter 8c. Accordingly, a harness or the like is not provided that is for delivery and reception of electric power between the drive motor 4 and the electric power conversion apparatuses and passes through external portions of the motor casing 4a and the electric power conversion apparatus casing 8a.

Similarly, the alternating current electric power generated by the generator 6 is charged to the lithium-ion battery 20 via the converter 8c in the electric power conversion apparatus casing 8a. Thus, plural bus bars 26 as second conductors for connecting the generator 6 with the converter 8c also extend in an internal portion of the generator casing 6a and the electric power conversion apparatus casing 8a that are integrated. Accordingly, a harness or the like is not provided that is for delivery and reception of electric power between the generator 6 and the electric power conversion apparatus (converter 8c) and passes through external portions of the generator casing 6a and the electric power conversion apparatus casing 8a.

Next, a description will be made about connection of an intake pipe and an exhaust pipe to the internal combustion engine with reference to FIG. 4 and FIG. 5.

Figure 4:
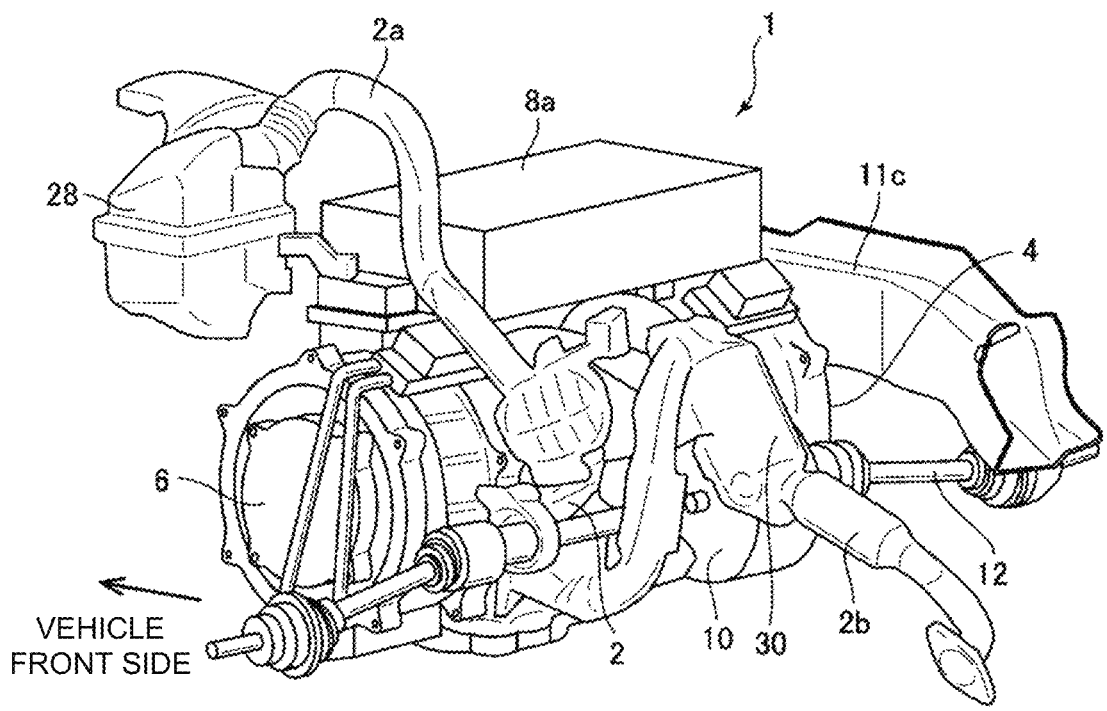
FIG. 4 is a perspective view of the vehicle driving apparatus according to an exemplary embodiment of the present disclosure as seen from an obliquely rearward left side.

FIG. 4 is a perspective view of the vehicle driving apparatus 1 according to an embodiment of the present invention as seen from an obliquely rearward left side. FIG.

5 is a side cross-sectional view of the vehicle driving apparatus 1 according to an embodiment of the present disclosure as seen from a left side.

Figure 5:
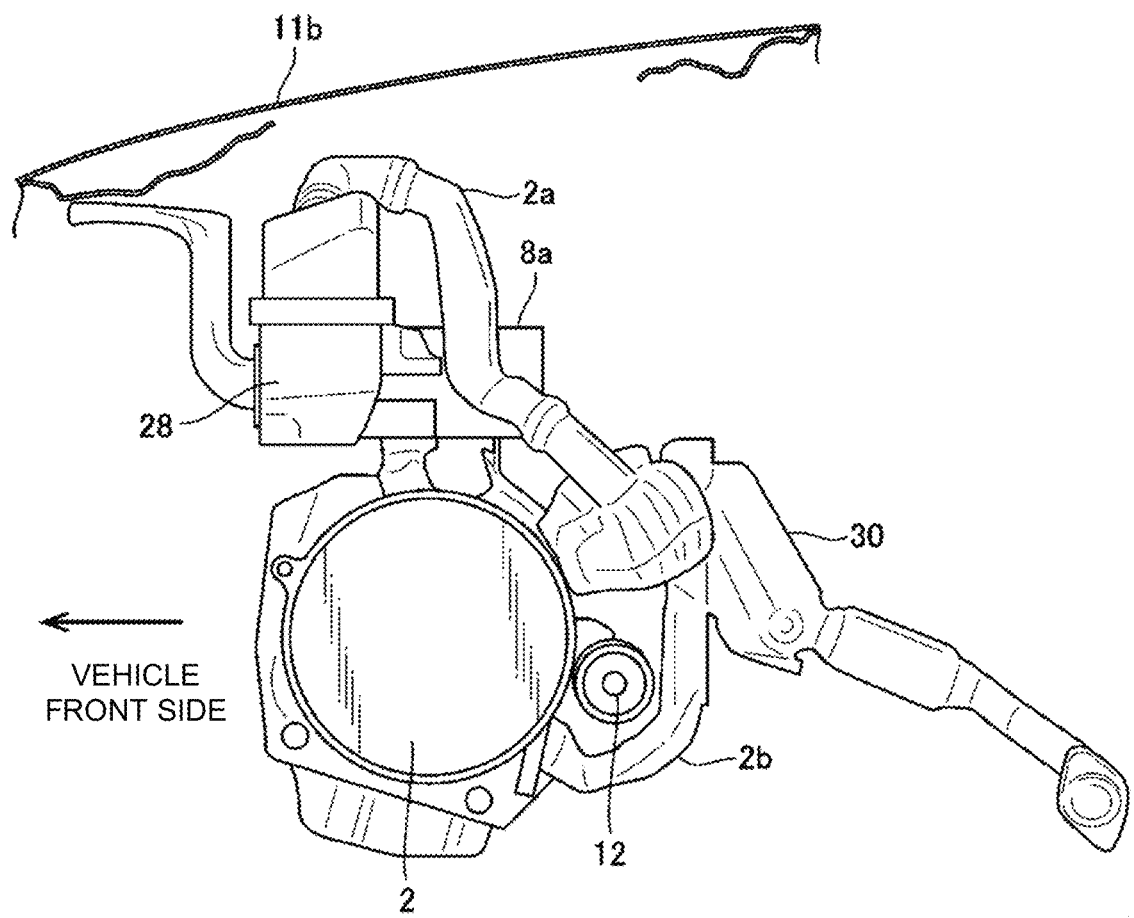
FIG. 5 is a side cross-sectional view of the vehicle driving apparatus according to an exemplary embodiment of the present disclosure as seen from a left side.

As illustrated in FIG. 4 and FIG. 5, in the internal combustion engine 2 included in the vehicle driving apparatus 1, to a side surface thereof on a rear side in the front-rear direction of the vehicle 11, an intake pipe 2a and an exhaust pipe 2b are connected.

The intake pipe 2a first extends from an upper portion of a side surface on a rear side of the internal combustion engine 2 (on a rearward side of the vehicle 11) to the rearward side of the vehicle 11 and thereafter extends to a front side of the internal combustion engine 2 while passing above the internal combustion engine 2 and the generator 6. Further, the drive shaft 12 extends on the rear side of the internal combustion engine 2 while crossing the vehicle 11, and the intake pipe 2a is connected with the internal combustion engine 2 on an upper side of the drive shaft 12. In addition, an air cleaner 28 is provided in a distal end portion of the intake pipe 2a and is configured to remove dust in air to be taken into the internal combustion engine 2.

Meanwhile, the exhaust pipe 2b extends from a lower portion on the side surface on the rear side of the internal combustion engine 2 (on the rearward side of the vehicle 11) to the rearward side of the vehicle 11 and is inserted into a tunnel portion provided at a center of a lower portion of the vehicle 11. Further, a catalyzer (catalytic converter) 30 is provided in a halfway portion of this exhaust pipe 2b and is configured to remove harmful components in exhaust gas. Further, the exhaust pipe 2b is connected with the internal combustion engine 2 on a lower side of the drive shaft 12 on the rear side of the internal combustion engine 2, first extends downward to bypass the drive shaft 12, thereafter extends upward, and is connected with the catalyzer 30. Thus, as illustrated in FIG. 5, the drive shaft 12 extends in the width direction of the vehicle 11 through a portion between the intake pipe 2a and the exhaust pipe 2b that extend from the internal combustion engine 2 to the rearward side of the vehicle 11. Accordingly, the internal combustion engine 2 and its intake pipe 2a and exhaust pipe 2b can efficiently be accommodated in the narrow motor room 11a on a lower side of the bonnet 11b.

In the vehicle driving apparatus 1 of an embodiment of the present disclosure, in the vehicle width direction of the vehicle 11, the drive motor 4, the internal combustion engine 2, and the generator 6 are arranged in this order (FIG. 2). As a result, because the internal combustion engine 2 with a comparatively large weight is positioned between the drive motor 4 and the generator 6, the weight balance between left and right of the vehicle 11 is less likely to be unstable, and the weight balance can be inhibited from being deteriorated. Further, because the internal combustion engine 2 is positioned between the drive motor 4 and the generator 6, the internal combustion engine 2 is positioned on a comparatively inner side in the vehicle width direction, inertia moments around a yaw axis and around a roll axis of the vehicle 11 can be lowered, and lowering of motion performance can thereby be inhibited.

Further, in the vehicle driving apparatus 1 of the present embodiment, because a rotary piston engine is employed as the internal combustion engine 2, the internal combustion engine 2 is less likely to be bulky in the motor room 11a even when being arranged between the drive motor 4 and the generator 6. Thus, even when the internal combustion engine 2 is arranged between the drive motor 4 and the generator 6, a space in the motor room 11a can effectively be utilized.

In addition, in the vehicle driving apparatus 1 of the present embodiment, a rotary piston engine is employed as the internal combustion engine 2, and the intake pipe 2a and the exhaust pipe 2b extend rearward from a rear side of the rotary piston engine (FIG. 4). Accordingly, routing of the intake pipe 2a and the exhaust pipe 2b can be simplified, and intake efficiency and exhaust efficiency can be improved.

Further, in the vehicle driving apparatus 1 of the present embodiment, because the reduction gear 10 is arranged between the drive motor 4 and the internal combustion engine 2 in the vehicle width direction of the vehicle 11, speed reduction can be performed by easily connecting an output of the drive motor 4 to the reduction gear 10.

In addition, in the vehicle driving apparatus 1 of the present embodiment, the bus bars 24 are arranged in the internal portion of the electric power conversion apparatus casing 8a and the casing of the drive motor 4, and the bus bars 26 are arranged in the internal portion of the electric power conversion apparatus casing 8a and the casing of the generator 6 (FIG. 3). Thus, an insulating material for securing insulation of each of the bus bars extending in the internal portions of the casings can be simplified compared to insulating materials for harnesses connecting electric devices in external portions of casings. Accordingly, costs required for insulating materials and weights can be reduced.

Further, in the vehicle driving apparatus 1 of the present embodiment, because the center C1 of the electric power conversion apparatus casing 8a is positioned on the side where the drive motor 4 is arranged with respect to the central axis line C2 of the vehicle 11 (FIG. 2), the weight balance of the whole vehicle driving apparatus 1 can further be improved.

In addition, in the vehicle driving apparatus 1 of the present embodiment, because the electric power conversion apparatus casing 8a and the casing of the drive motor 4 are joined together and the inverter 8b is included as the electric power conversion apparatus, direct current electric power supplied from the lithium-ion battery 20 or the like can be converted to an alternating current and can be supplied to the drive motor 4 in a short distance. Accordingly, the alternating-current drive motor 4 can be operated in a compact configuration. Further, because the electric power conversion apparatus casing 8a and the casing of the generator 6 are joined together and the converter 8c is included as the electric power conversion apparatus, alternating current electric power generated by the generator 6 can easily be converted to a direct current. Accordingly, an output of the alternating-current generator 6 can be charged to a battery or the like in a compact configuration.

Further, in the vehicle driving apparatus 1 of the present embodiment, an overlapping amount S1 between the drive motor 4 and the electric power conversion apparatus casing 8a is configured to be larger than an overlapping amount S2 between the generator 6 and the electric power conversion apparatus casing 8a. Thus, the electric power conversion apparatus casing 8a is arranged, the center of gravity of the vehicle driving apparatus 1 can thereby be moved to the drive motor 4 side, and the weight balance of the whole vehicle driving apparatus 1 can further be improved.

In addition, in the vehicle driving apparatus 1 of the present embodiment, because the drive motor 4, the internal combustion engine 2, and the generator 6 are arranged below the bonnet 11b, a space below the bonnet 11b can effectively be utilized.

In the above, an embodiment of the present disclosure is described, but various changes may be added to the above-described embodiment. That is, in the above-described embodiment, the internal combustion engine drives the generator, and the drive shaft is not directly driven by the internal combustion engine; however, the present disclosure can be applied to a vehicle driving apparatus in which a drive shaft is driven by motive power of an internal combustion engine. Further, the present disclosure can also be applied to a vehicle driving apparatus whose battery is principally charged by an external electric power source. In addition, in the above-described embodiment, a rotary piston engine is employed as the internal combustion engine; however, various types of engines can be employed as the internal combustion engine. For example, a horizontally opposed engine can be employed as the internal combustion engine. This horizontally opposed engine has a low overall height similarly to a rotary piston engine and is suitable because the space factor in the motor room is not decreased even in a case where the casings of the electric power conversion apparatuses and so forth are arranged above the internal combustion engine.

Figure 6:
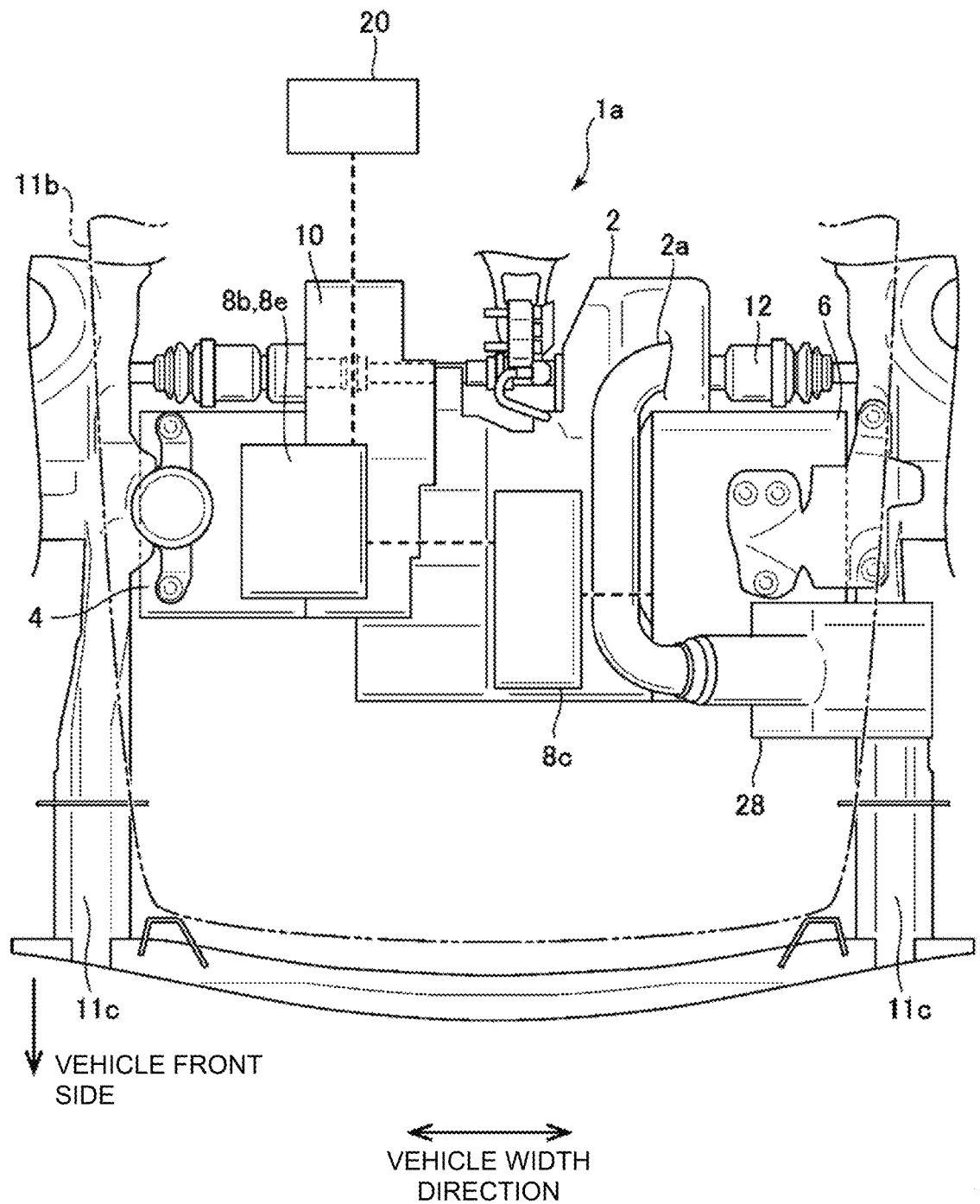
FIG. 6 is a plan view illustrating a state where a vehicle driving apparatus according to another exemplary embodiment of the present disclosure is installed in a vehicle.
Figure 7:
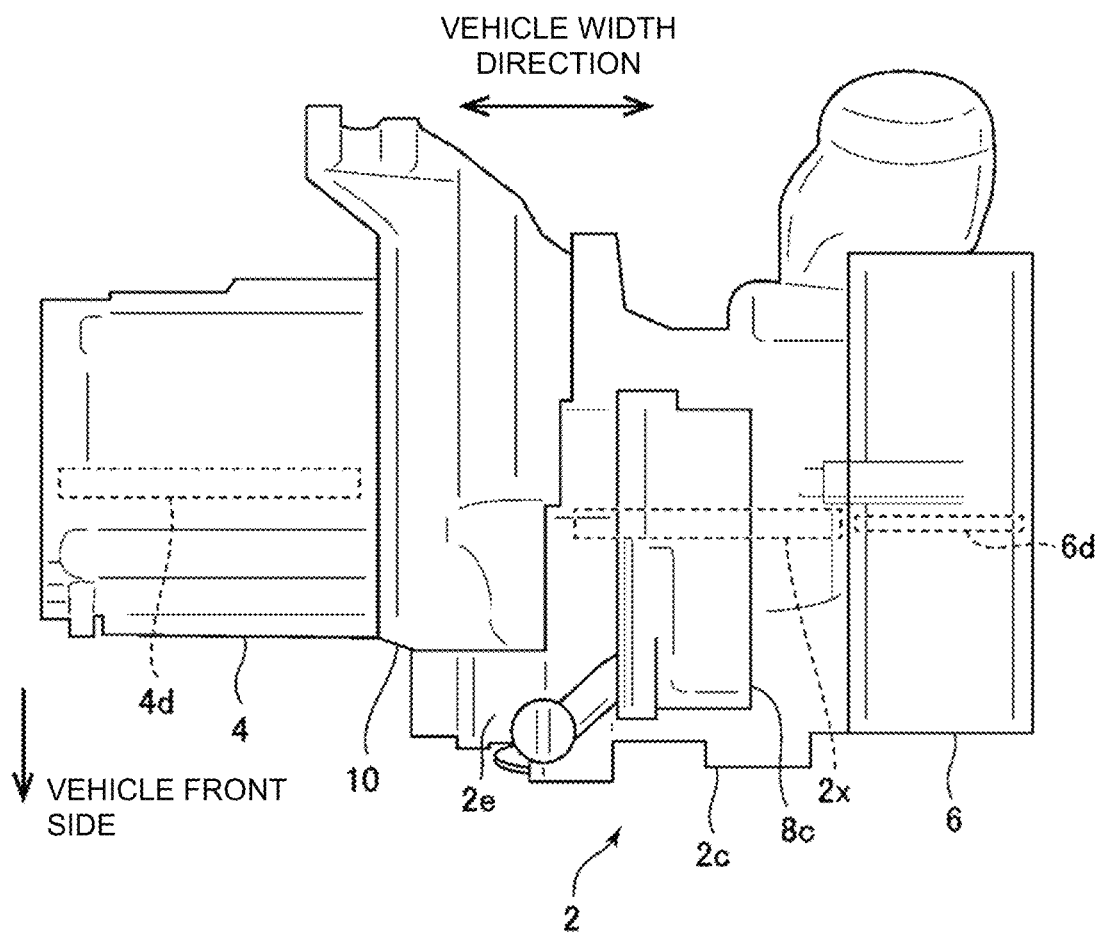
FIG. 7 is a plan view of the vehicle driving apparatus according to the other exemplary embodiment of the present disclosure.
Figure 8:
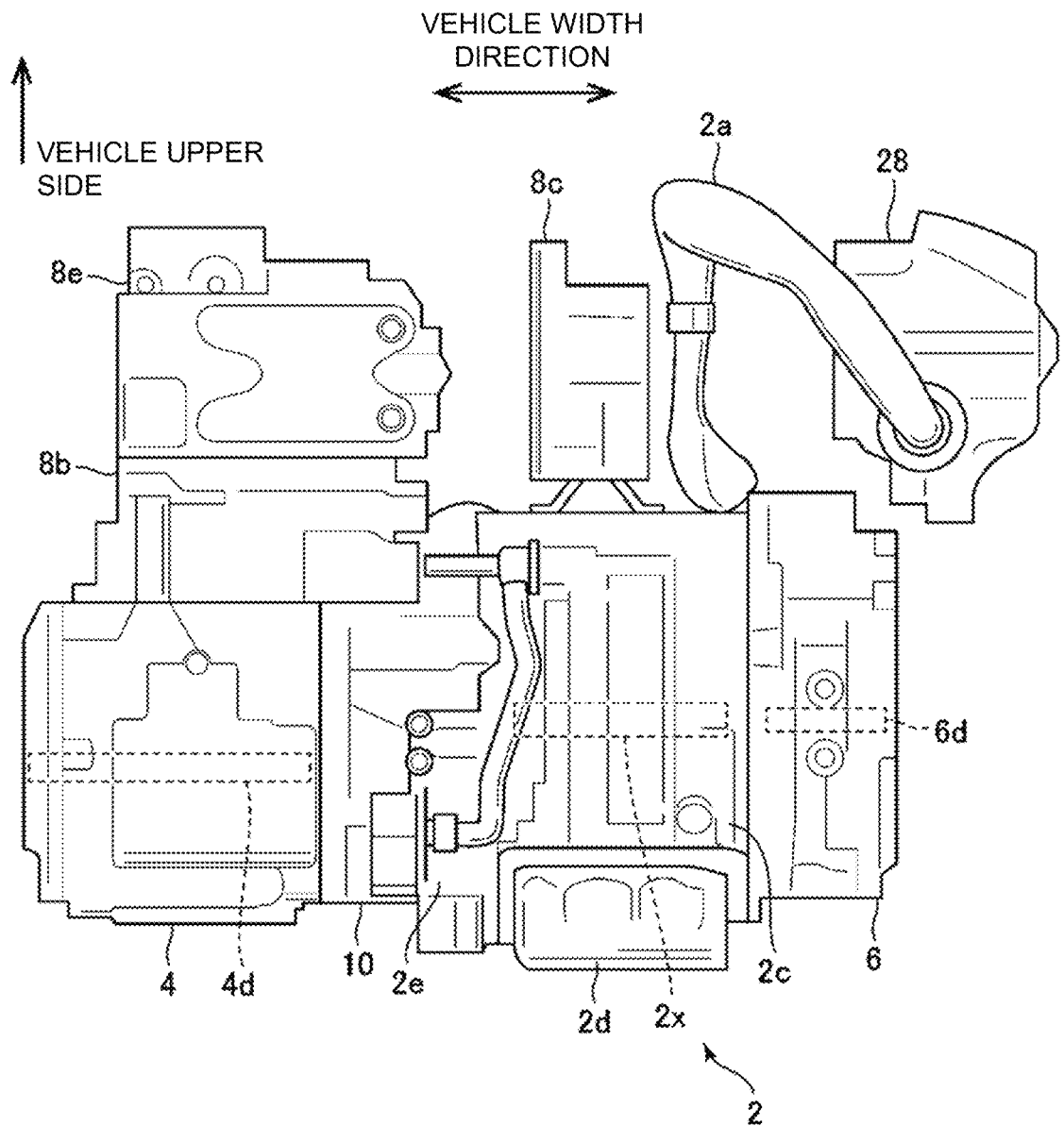
FIG. 8 is a front view of the vehicle driving apparatus according to the other exemplary embodiment of the present disclosure.

Next, a vehicle driving apparatus 1a according to another exemplary embodiment of the present disclosure will be described with reference to FIG. 6 to FIG. 8. FIG. 6 is a plan view (top view) illustrating a state where the vehicle driving apparatus 1a according to the other exemplary embodiment of the present disclosure is installed in a vehicle. FIG. 7 is a plan view (top view) of the vehicle driving apparatus 1a according to the other exemplary embodiment of the present disclosure. This FIG. 7 illustrates only main parts among components illustrated in FIG. 6). FIG. 8 is a front view of the vehicle driving apparatus 1a according to the other exemplary embodiment of the present disclosure. This FIG. 8 also illustrates only main parts among the components illustrated in FIG. 6 (different from FIG. 7, FIG. 8 illustrates the inverter 8b, the air cleaner 28, and so forth).

As illustrated in FIG. 6, similarly to the vehicle driving apparatus 1 according to the above-described embodiment, in the vehicle driving apparatus 1a according to the other exemplary embodiment of the present invention, the drive motor 4, the reduction gear 10, the internal combustion engine 2, and the generator 6 are arranged in this order in the vehicle width direction. However, the vehicle driving apparatus 1a does not include the electric power conversion apparatus casing 8a as in the vehicle driving apparatus 1, but the inverter 8b, the converter 8c, and so forth are separately arranged. Specifically, in the vehicle driving apparatus 1a, the inverter 8b is arranged above the drive motor 4, and the converter 8c is arranged above the internal combustion engine 2. Further, in the vehicle driving apparatus 1a, a junction box 8e is arranged on the inverter 8b (see FIG. 8), the junction box 8e housing terminals and so forth for joining, branching, and relaying electric wires of the inverter 8b, the converter 8c, the lithium-ion battery 20, and so forth. In addition, as indicated by broken lines in FIG. 6, the generator 6, the converter 8c, the junction box 8e, and the lithium-ion battery 20 are electrically connected together in this order. Note that as the reduction gear 10, a transaxle may be used that includes a speed reduction mechanism and a differential mechanism.

Further, as illustrated in FIG. 8, in the vehicle driving apparatus 1a according to the other exemplary embodiment, in a front view, an oil pan 2d is provided in a lower portion of an internal combustion engine body 2c, and an output shaft 2x (see broken lines in FIG. 8) of the internal combustion engine 2 is arranged to be offset to a vehicle upward side with respect to the output shaft 4d (see broken lines in FIG. 8) of the drive motor 4. The output shaft 2x of the internal combustion engine 2 is arranged to be offset above the vehicle relative to the output shaft 4d of the drive motor 4 as described above, and a capacity of the oil pan 2d in the lower portion of the internal combustion engine body 2c can thereby appropriately be secured. Note that usually, the output shaft 2x of the internal combustion engine 2 is arranged in a general center position of the internal combustion engine 2 in a vehicle up-down direction (the center position between an upper end and a lower end of the internal combustion engine 2), and the output shaft 4d of the drive motor 4 is arranged in a general center position of the drive motor 4 in the vehicle up-down direction (the central position between an upper end and a lower end of the drive motor 4). Thus, when the output shaft 2x of the internal combustion engine 2 is arranged to be offset upward with respect to the output shaft 4d of the drive motor 4, the center position of the internal combustion engine 2 in the vehicle up-down direction is positioned above the center position of the drive motor 4 in the vehicle up-down direction.

Meanwhile, because the output shaft 2x of the internal combustion engine 2 and the input shaft 6d of the generator 6 are coupled together, those output shaft 2x and input shaft 6d are positioned on generally the same axis line (see broken lines in FIG. 7 and FIG. 8).

Further, as illustrated in FIG. 7, in a planar view, a front end portion of the internal combustion engine 2 is positioned on a vehicle forward side of a front end portion of the drive motor 4. Accordingly, in a collision of a vehicle front portion, an object moving from the front toward the vehicle driving apparatus 1a can be caused to contact with the internal combustion engine 2 earlier than the drive motor 4, and the drive motor 4 can thereby appropriately be protected by the internal combustion engine 2.

Further, as illustrated in FIG. 7, in a planar view, the output shaft 2x (see the broken lines in FIG. 7) of the internal combustion engine 2 is arranged to be offset to the vehicle forward side with respect to the output shaft 4d (see the broken lines in FIG. 7) of the drive motor 4, and a heat exchanger 2e as an auxiliary device (engine auxiliary device) of the internal combustion engine 2 is mounted on a front portion of the internal combustion engine body 2c in front of the drive motor 4 and the reduction gear 10 (see FIG. 8 also). Usually, the output shaft 2x of the internal combustion engine 2 is arranged in a general center position of the internal combustion engine 2 in the vehicle front-rear direction (the center position between a right end and a left end of the internal combustion engine 2), and the output shaft 4d of the drive motor 4 is arranged in a general center position of the drive motor 4 in the vehicle front-rear direction (the central position between a right end and a left end of the drive motor 4). Thus, when the output shaft 2x of the internal combustion engine 2 is arranged to be offset forward with respect to the output shaft 4d of the drive motor 4, the center position of the internal combustion engine 2 in the vehicle front-rear direction is positioned in front of the center position of the drive motor 4 in the vehicle front-rear direction.

The heat exchanger 2e has an oil cooler for cooling oil, a water pump for supplying water for cooling the oil to the oil cooler, an oil filter for removing impurities in the oil, and so forth. Although the water pump is driven by the output shaft 2x of the internal combustion engine 2, because its vehicle-width-direction dimension becomes large when a shaft of the water pump is arranged on the same axis line as the output shaft 2x, the shaft of the water pump is arranged to be shifted from the output shaft 2x (in this case, motive power is transmitted from the output shaft 2x to the shaft of the water pump via a chain). Thus, the heat exchanger 2e including the water pump is provided on a vehicle-width-direction inner side with respect to the internal combustion engine body 2c. Accordingly, the heat exchanger 2e is positioned in front of the drive motor 4 and the reduction gear 10.

After all, the output shaft 2x of the internal combustion engine 2 is arranged to be offset in front of the vehicle relative to the output shaft 4d of the drive motor 4, and a space can thereby be formed in front of the drive motor 4 and the reduction gear 10. In the other exemplary embodiment, by using such a space, the above-described heat exchanger 3e is arranged (specifically, the heat exchanger 2e is arranged to overlap with the reduction gear 10 in a front view). Accordingly, an increase in a dimension of the vehicle driving apparatus 1a in the vehicle width direction can appropriately be inhibited. Further, the heat exchanger 2e is arranged in front of the drive motor 4 and the reduction gear 10, in a collision of the vehicle front portion, an object moving from the front toward the vehicle driving apparatus 1a can be caused to contact with the heat exchanger 2e earlier than the drive motor 4 and the reduction gear 10, and the drive motor 4 and the reduction gear 10 can thereby appropriately be protected by the heat exchanger 2e.

Note that the auxiliary device of the internal combustion engine 2 is not limited to use of the above-described heat exchanger 2e. The auxiliary device of the internal combustion engine 2 is a device necessary for operating the internal combustion engine 2, for example. In other examples, an electrical generator (alternator), an injection pump, and so forth that are driven by motive power produced by the internal combustion engine 2 can be applied.

Further, as illustrated in FIG. 6 and FIG. 7, in the vehicle driving apparatus 1a according to the other exemplary embodiment, the converter 8c is arranged to overlap with an upper surface of the internal combustion engine 2 in a planar view. Specifically, an outer side end of the converter 8c in the vehicle width direction is positioned on an inner side of an outer side end of the internal combustion engine 2 in the vehicle width direction, and a front end portion of the converter 8c is positioned on a vehicle rearward side of the front end portion of the internal combustion engine 2. Accordingly, in a planar view, the whole converter 8c overlaps on the internal combustion engine 2 (FIG. 7). The converter 8c is arranged as described above, and in a collision of the vehicle front portion, the body side frame 11c or the like that is deformed can thereby be inhibited from interfering with the converter 8c. Specifically, in a collision of the vehicle front portion, the deformed body side frame 11c or the like can be caused to contact with the internal combustion engine 2 earlier than the converter 8c, and the converter 8c can thereby appropriately be protected by the internal combustion engine 2.

Further, as illustrated in FIG. 6 and FIG. 8, in a planar view, the inverter 8b and the junction box 8e are arranged to overlap with an upper surface of the drive motor 4. Specifically, such that outer side ends of the inverter 8b and the junction box 8e in the vehicle width direction are positioned on an inner side of an outer side end of the drive motor 4 in the vehicle width direction, those are arranged on the drive motor 4. Accordingly, in a collision of the vehicle front portion, the inverter 8b and the junction box 8e can thereby appropriately be protected by the drive motor 4.

Further, as illustrated in FIG. 6 and FIG. 8, the air cleaner 28 on the generator 6 is arranged to be offset outward in the vehicle width direction with respect to the converter 8c. Accordingly, in a collision of the vehicle front portion, the damaged air cleaner 28 can appropriately be inhibited from interfering with the converter 8c. In addition, the intake pipe 2a connecting the air cleaner 28 and the internal combustion engine 2 together is separately arranged from the converter 8c. Specifically, the intake pipe 2a is arranged with respect to the converter 8c such that the intake pipe 2a does not overlap with the converter 8c in a planar view (FIG. 6) and the intake pipe 2a does not overlap with the converter 8c in a front view (FIG. 8). Accordingly, in a collision of the vehicle front portion, the damaged intake pipe 2a can appropriately be inhibited from interfering with the converter 8c.

Advantageous Effect of Disclosure

A vehicle driving apparatus according to the present invention includes a drive motor, an internal combustion engine, and an electrical generator and can inhibit a weight balance and motion performance of a vehicle from being deteriorated and lowered.

REFERENCE SIGNS LIST 1 vehicle driving apparatus
1a vehicle driving apparatus
2 internal combustion engine
2a intake pipe
2b exhaust pipe
2c internal combustion engine body
2d oil pan
2e heat exchanger (auxiliary device)
2x output shaft
4 drive motor
4a motor casing
4b rotor
4c stator
4d output shaft
6 generator (electrical generator)
6a generator casing
6b rotor
6c stator
6d input shaft
8a electric power conversion apparatus casing
8b inverter (electric power conversion apparatus)
8c converter (electric power conversion apparatus)
8d cooling liquid chamber
8e junction box
10 reduction gear (speed reduction mechanism)
11 vehicle
11a motor room
11b bonnet
11c body side frame
12 drive shaft
14 radiator dedicated to internal combustion engine
16 radiator dedicated to electric power conversion apparatuses
16a inflow pipe
16b outflow pipe
18 oil cooler
20 lithium-ion battery
24 bus bar (first conductor)
26 bus bar (second conductor)
28 air cleaner
30 catalyzer

The invention claimed is:

1. A vehicle driving apparatus driving a vehicle by motive power of a drive motor, the vehicle driving apparatus comprising:

the drive motor that is driven by electric power;
an internal combustion engine that produces motive power by fuel; and
an electrical generator that is driven by the internal combustion engine,
wherein the drive motor, the internal combustion engine, and the electrical generator are arranged in a vehicle width direction of the vehicle in order of the drive motor, the internal combustion engine, and the electrical generator from a vehicle right side to a vehicle left side,
wherein the internal combustion engine is a rotary piston engine, and an intake pipe and an exhaust pipe of the rotary piston engine extend from a rear side of the rotary piston engine in a front-rear direction of the vehicle to a rearward side of the vehicle;
a speed reducer provided in a transmission path for transmitting motive power of the drive motor to a wheel of the vehicle, wherein the speed reducer is arranged between the drive motor and the internal combustion engine in the vehicle width direction of the vehicle; and
an electric power conversion apparatus electrically connected with each of the drive motor and the electrical generator;
a first conductor connecting the electric power conversion apparatus with the drive motor; and
a second conductor connecting the electric power conversion apparatus with the electrical generator, wherein each of the first conductor and the second conductor is arranged in an internal portion of a casing of the electric power conversion apparatus. a casing of the drive motor, or a casing of the electrical generator, and the casing of the electric power conversion apparatus is joined to each of the casing of the drive motor and the casing of the electrical generator so as to straddle over the internal combustion engine.

2. The vehicle driving apparatus according to claim 1, wherein a center of the casing of the electric power conversion apparatus in the vehicle width direction is positioned on a side where the drive motor is arranged with respect to a central axis line of the vehicle that extends in a front-rear direction of the vehicle.

3. The vehicle driving apparatus according to claim 1, wherein the electric power conversion apparatus includes an inverter that is electrically connected with the drive motor and converts a direct current to an alternating current and a converter that is electrically connected with the electrical generator and converts an alternating current to a direct current.

4. The vehicle driving apparatus according to claim 1, wherein in a planar view, the drive motor and the casing of the electric power conversion apparatus arranged above the drive motor overlap with each other, the electrical generator and the casing of the electric power conversion apparatus arranged above the electrical generator overlap with each other, and an overlapping amount between the drive motor and the casing of the electric power conversion apparatus is configured to be larger than an overlapping amount between the electrical generator and the casing of the electric power conversion apparatus.

5. The vehicle driving apparatus according to claim 4, wherein the drive motor, the internal combustion engine, and the electrical generator are housed in a motor room provided in a front portion of the vehicle, and the drive motor, the internal combustion engine, and the electrical generator are arranged below a bonnet covering the motor room.

6. The vehicle driving apparatus according to claim 5, wherein in a front view, an oil pan is provided in a lower portion of the internal combustion engine, and an output shaft of the internal combustion engine is arranged to be offset to a vehicle upward side with respect to an output shaft of the drive motor.

7. The vehicle driving apparatus according to claim 6, wherein in the planar view, a front end portion of the internal combustion engine is positioned on a vehicle forward side of a front end portion of the drive motor.

8. The vehicle driving apparatus according to claim 7, wherein in the planar view, the output shaft of the internal combustion engine is arranged to be offset to a vehicle forward side with respect to the output shaft of the drive motor, and a predetermined auxiliary device related to the internal combustion engine is mounted on a front portion of the internal combustion engine in front of the drive motor.

9. The vehicle driving apparatus according to claim 8, wherein each of the drive motor, the internal combustion engine, and the electrical generator is arranged such that each of the output shaft of the internal combustion engine, the output shaft of the drive motor, and an input shaft of the electrical generator extends along the vehicle width direction.

10. A vehicle driving apparatus driving a vehicle by motive power of a drive motor, the vehicle driving apparatus comprising:
the drive motor that is driven by electric power;
an internal combustion engine that produces motive power by fuel;
an electrical generator that is driven by the internal combustion engine, wherein the drive motor, the internal combustion engine. and the electrical generator are arranged in a vehicle width direction of the vehicle in order of the drive motor, the internal combustion engine, and the electrical generator from a vehicle right side to a vehicle left side; and
an electric power conversion apparatus electrically connected with each of the drive motor and the electrical generator; a first conductor connecting the electric power conversion apparatus with the drive motor; and a second conductor connecting the electric power conversion apparatus with the electrical generator, wherein each of the first conductor and the second conductor is arranged in an internal portion of a casing of the electric power conversion apparatus, a casing of the drive motor, or a casing of the electrical generator, and the casing of the electric power conversion apparatus is joined to each of the casing of the drive motor and the casing of the electrical generator so as to straddle over the internal combustion engine.

11. The vehicle driving apparatus according to claim 1, wherein the drive motor, the internal combustion engine, and the electrical generator are housed in a motor room provided in a front portion of the vehicle, and the drive motor, the internal combustion engine, and the electrical generator are arranged below a bonnet covering the motor room.

12. The vehicle driving apparatus according to claim 1, wherein in a front view, an oil pan is provided in a lower portion of the internal combustion engine, and an output shaft of the internal combustion engine is arranged to be offset to a vehicle upward side with respect to an output shaft of the drive motor.

13. The vehicle driving apparatus according to claim 1, wherein in a planar view, a front end portion of the internal combustion engine is positioned on a vehicle forward side of a front end portion of the drive motor.

14. The vehicle driving apparatus according to claim 1, wherein in a planar view, an output shaft of the internal combustion engine is arranged to be offset to a vehicle forward side with respect to an output shaft of the drive motor, and a predetermined auxiliary device related to the internal combustion engine is mounted on a front portion of the internal combustion engine in front of the drive motor.

15. The vehicle driving apparatus according to claim 1, wherein each of the drive motor, the internal combustion engine, and the electrical generator is arranged such that each of an output shaft of the internal combustion engine, an output shaft of the drive motor, and an input shaft of the electrical generator extends along the vehicle width direction.

\* \* \* \* \*